United States Patent
Jaffe et al.

(10) Patent No.: US 10,219,036 B2
(45) Date of Patent: Feb. 26, 2019

(54) DYNAMICALLY ADJUSTING VIDEO MERCHANDISING TO REFLECT USER PREFERENCES

(71) Applicant: NETFLIX, INC., Los Gatos, CA (US)

(72) Inventors: Christopher Stewart Jaffe, San Mateo, CA (US); Rico Nasol, San Jose, CA (US); Michael Bell, San Jose, CA (US); John McLord, San Francisco, CA (US); Joubert Nel, Palo Alto, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

(21) Appl. No.: 15/437,378

(22) Filed: Feb. 20, 2017

(65) Prior Publication Data

US 2017/0164053 A1 Jun. 8, 2017

Related U.S. Application Data

(62) Division of application No. 14/832,988, filed on Aug. 21, 2015, now abandoned.

(Continued)

(51) Int. Cl.
*H04N 5/445* (2011.01)
*H04N 21/442* (2011.01)
(Continued)

(52) U.S. Cl.
CPC ..... *H04N 21/44222* (2013.01); *G06F 3/0482* (2013.01); *G06F 3/04812* (2013.01); *H04N 21/2353* (2013.01); *H04N 21/2387* (2013.01); *H04N 21/23418* (2013.01); *H04N 21/23424* (2013.01); *H04N 21/25891* (2013.01); *H04N 21/4312* (2013.01); *H04N 21/44* (2013.01); *H04N 21/44008* (2013.01);
(Continued)

(58) Field of Classification Search
CPC ....... H04N 21/44222; H04N 21/43418; H04N 21/2353; H04N 21/2387; H04N 21/4312; H04N 21/44008; H04N 21/4532; H04N 21/47217; H04N 21/812; G06F 3/04812; G06F 3/0482
See application file for complete search history.

(56) References Cited

U.S. PATENT DOCUMENTS 5,986,692 A * 11/1999 Logan .................. H04H 20/106
348/E7.075
6,018,765 A 1/2000 Durana et al.
(Continued)

OTHER PUBLICATIONS

Non-final Office Action for U.S. Appl. No. 14/832,990 dated Aug. 22, 2016.
(Continued)

*Primary Examiner* — John R Schnurr
(74) *Attorney, Agent, or Firm* — Artegis Law Group, LLP

(57) ABSTRACT

One embodiment of the present invention sets forth a technique for displaying scenes included in media assets. The technique includes selecting a first scene included in a first video asset based on one or more preferences and metadata associated with multiple scenes. The first video asset is one of multiple video assets, and each scene included in the multiple scenes is included in one of the video assets included in the multiple video assets. The technique further includes displaying the first scene within a first portion of a display area.

20 Claims, 8 Drawing Sheets

Related U.S. Application Data

(60) Provisional application No. 62/040,993, filed on Aug. 22, 2014.

(51) Int. Cl.

| | | |
|---|---|---|
| *H04N 21/234* | (2011.01) | |
| *H04N 21/258* | (2011.01) | |
| *H04N 21/81* | (2011.01) | |
| *H04N 21/235* | (2011.01) | |
| *H04N 21/44* | (2011.01) | |
| *H04N 21/845* | (2011.01) | |
| *G06F 3/0481* | (2013.01) | |
| *G06F 3/0482* | (2013.01) | |
| *H04N 21/2387* | (2011.01) | |
| *H04N 21/431* | (2011.01) | |
| *H04N 21/45* | (2011.01) | |
| *H04N 21/472* | (2011.01) | |
| *H04N 21/2662* | (2011.01) | |

(52) U.S. Cl.
CPC ... *H04N 21/44218* (2013.01); *H04N 21/4532* (2013.01); *H04N 21/47217* (2013.01); *H04N 21/812* (2013.01); *H04N 21/8456* (2013.01); *H04N 21/2662* (2013.01)

(56) References Cited

U.S. PATENT DOCUMENTS

| | | |
|---|---|---|
| 6,345,293 B1 | 2/2002 | Chaddha |
| 6,345,388 B1 | 2/2002 | Nishio et al. |
| 2005/0012761 A1 | 1/2005 | Shiomi et al. |
| 2005/0183017 A1* | 8/2005 | Cain ................ G06F 8/38 715/719 |
| 2005/0278760 A1 | 12/2005 | Dewar |
| 2007/0083883 A1 | 4/2007 | Deng |
| 2007/0136679 A1* | 6/2007 | Yang ............... H04N 5/44513 715/772 |
| 2007/0136750 A1* | 6/2007 | Abanami .......... H04N 5/44543 725/44 |
| 2008/0066110 A1 | 3/2008 | Brodersen |
| 2009/0086095 A1 | 4/2009 | Boger et al. |
| 2010/0153885 A1* | 6/2010 | Yates ............... G06F 3/0482 715/841 |
| 2010/0303167 A1 | 12/2010 | Juang et al. |
| 2011/0296458 A1 | 12/2011 | Di Mattia et al. |
| 2014/0007163 A1* | 1/2014 | Johnson ............ H04N 21/482 725/43 |
| 2014/0130104 A1 | 5/2014 | Ruffini |
| 2015/0172787 A1* | 6/2015 | Geramifard ...... H04N 21/8549 725/40 |

OTHER PUBLICATIONS

Non-final Office Action for U.S. Appl. No. 14/832,990 dated May 22, 2017.

Final Office Action for U.S. Appl. No. 14/832,990 dated Sep. 14, 2017.

Non-final Office Action for U.S. Appl. No. 14/832,990 dated Mar. 29, 2018, 19 pages.

* cited by examiner

ID TYNAMICALLY ADJUSTING VIDEO MERCHANDISING TO REFLECT USER PREFERENCES

CROSS-REFERENCE TO RELATED APPLICATIONS

This application is a divisional of co-pending claims benefit of the U.S. patent application titled, "DYNAMICALLY ADJUSTING VIDEO MERCHANDISING TO REFLECT USER PREFERENCES," filed on Aug. 21, 2015 and having Ser. No. 14/832,988, which claims benefit of U.S. provisional application titled, "DYNAMICALLY ADJUSTING VIDEO MERCHANDISING TO REFLECT USER PREFERENCES," filed on Aug. 22, 2014 and having Ser. No. 62/040,993. The subject matter of these related applications is hereby incorporated herein by reference.

BACKGROUND OF THE INVENTION

Field of the Invention

The present invention relates generally to computer processing and, more specifically, to dynamically adjusting video merchandising to reflect user preferences.

Description of the Related Art

Attracting and maintaining customer interest in video assets using a variety of "merchandising" techniques is an important aspect of many video asset distribution systems. Typically, as part of merchandising video assets, a user interface included in the video asset distribution system is configured to present information to a user about a selected video asset in an attempt to convince the user that he or she would enjoy the selected video asset. In general, video asset distribution systems implement one or more different techniques for presenting such information to users.

In one technique, the user interface included in the video asset distribution system is configured to present text-based information to users. For example, such a user interface could display a video asset selection menu that includes a variety of icons, where each icon represents a different video asset. Upon detecting user interest in a particular icon, the video asset distribution system could display a pop-up that includes text describing the video asset associated with the icon in favorable terms, such as excerpts from positive reviews, descriptions of interesting aspects of the video asset, etc.

In another technique, the user interface included in the video distribution system is configured to present information to users through still-images. In such an approach, upon detecting a user selection, such a video distribution system could present a series of still-images designed to arouse a particular user interest. For example, to market an action movie, the video asset distribution system could sequentially present three still-images to the user—a still-image of the star of the movie, a still-image of an explosion, and a still-image of a knife fight. In some implementations, both text-based information and still-images can be displayed to users simultaneously.

One drawback to the above techniques is that presenting text-based information and still-images to users is contextually inconsistent with the general user experience associated with watching video assets. Imposing contextually inconsistent merchandising information on a particular user can cause the user to quickly lose interest in the video asset, resulting in the user choosing not to select and watch the video asset. Further, when a user does select and watch a video asset, after playback of the video asset is complete, presenting the user with text-based information and still-images could result in a loss of momentum. Consequently, the user may choose not to select and watch another video asset.

As the foregoing illustrates, what is needed in the art are more effective techniques for marketing video assets to users through video asset distribution systems.

SUMMARY OF THE INVENTION

One embodiment of the present invention sets forth a method for displaying scenes included in media assets. The method includes selecting a first scene included in a first video asset based on one or more preferences and metadata associated with multiple scenes, where the first video asset is included in multiple video assets, and each scene included in the multiple scenes is included in one of the video assets included in the multiple video assets; and displaying the first scene within a first portion of a display area.

One advantage of disclosed techniques for displaying scenes is that video asset engines may leverage these techniques to effectively merchandise video assets. More specifically, a video asset engine may select personalized scenes and present the selected scenes in a contextually-relevant manner. Consequently, the video asset engine is able to increase the likelihood of attracting and maintaining user interest in the video assets compared to video distribution systems that implement conventional merchandising techniques based on user-agnostic still-images and/or text.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

Video Asset Distribution System

Figure 1:
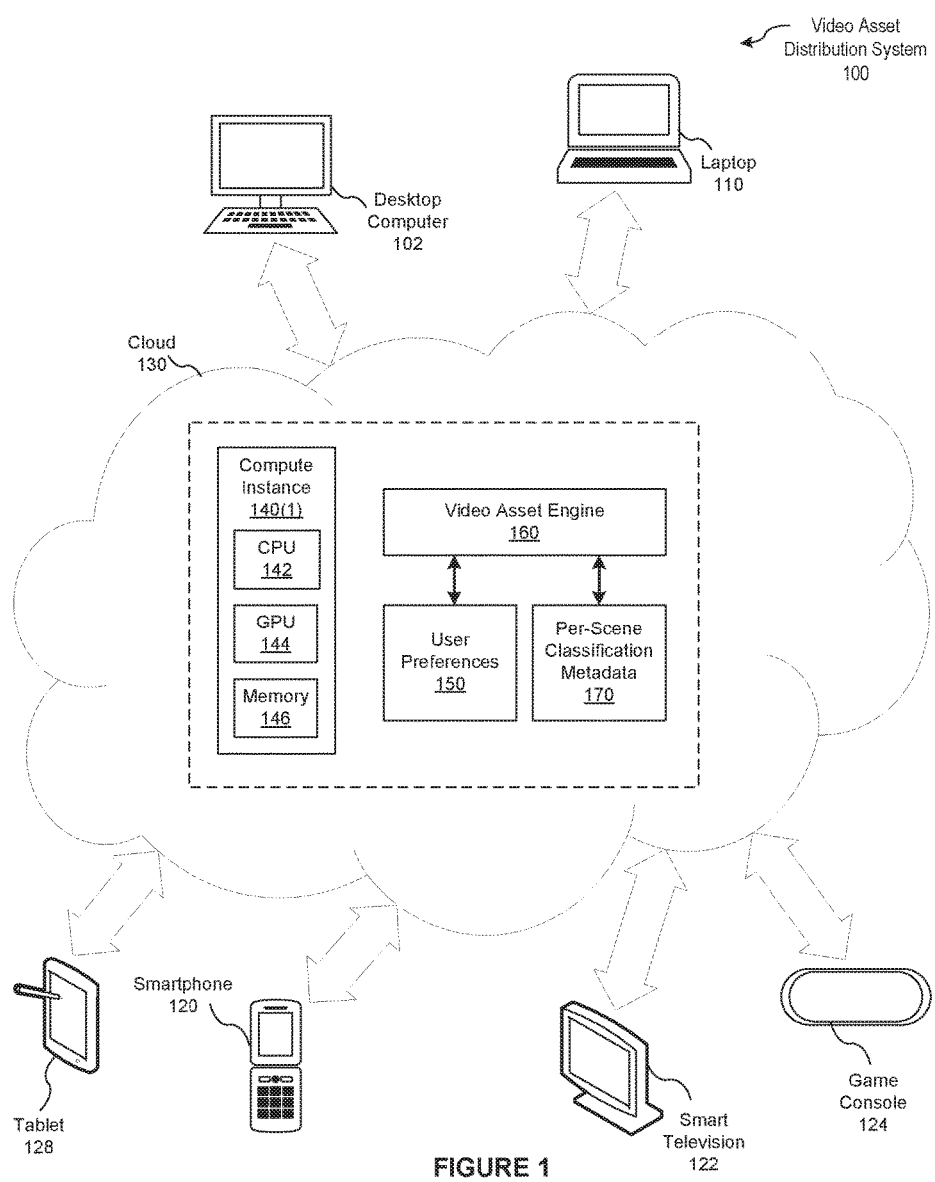
FIG. 1 is a block diagram of a video asset distribution system configured to implement one or more aspects of the invention.

FIG. 1 is a block diagram of a video asset distribution system 100 configured to implement one or more aspects of the invention. As shown, the video asset distribution system 100 includes a cloud 130 (e.g., encapsulated shared resources, software, data, etc.) connected to a variety of consumer devices capable of displaying video assets. Such consumer devices include, without limitation, a computer 102, a laptop 110, a smartphone 120, a smart television 122, a game console 124, a tablet 128, television-connected devices (not shown), handheld devices (not shown), and streaming entertainment devices (not shown).

As used herein, a video asset refers to any item that includes video content. Video assets may also include additional content, such as audio content, and may be manipulated (e.g., stored, encoded, compressed, transmitted, etc.) using any mechanisms known in the art. For example, one video asset may be a movie that is stored as a compressed audio-video file, transmitted via the internet, and then decompressed for display purposes.

In some embodiments, the consumer device is capable of running a web-browser configured to display a graphical user interface that enables the user to interact with the video assets. The implementation of the graphical user interface may differ based on the consumer device. For example, the laptop 110 could be configured to present the graphical user interface via a web-browser to enable users to browse video assets, select video assets, download video assets, and/or playback video assets.

The cloud 130 may include any number of compute instance 140 configured with any number (including zero) of central processing units (CPUs) 142, graphics processing units (GPUs) 144, memory 146, etc. The cloud 130 delivers video services, including both video and audio streams, associated with the video assets to the consumer devices over a network, such as the Internet, via a video asset engine 160. The video asset engine 160 includes logic that manages one or more graphical user interfaces. To generate viewer interest in video assets, the video asset engine 160 is configured to perform video merchandising, such as by advertising video assets using scenes (e.g., any number of consecutive frames) from the video assets as "teasers."

Notably, the video asset engine 160 dynamically selects and displays scenes based on user preferences 150 and previous user interactions. The user preferences 150 include specific metadata tags for which the user of the video asset engine 160 has explicitly or implicitly expressed interest or disinterest. Explicit evidence may include a list of metadata tags for which the user has explicitly expressed a preference. In operation, explicit evidence may be gathered based on the user providing explicit information regarding specific metadata tags. For example, the user may explicitly indicate that the "Comedy" metadata tag is of interest, while the "Horror" metadata tag is not of interest. Implicit evidence may include a list of metadata tags for which the user has implicitly expressed a preference. In operation, implicit evidence may be gathered based on the interactions of the user with digital content associated with specific metadata tags. For example, the user may assign a negative rating to digital content associated with the "Comedy" metadata tag, or the user may repeatedly request digital content with the "Horror" metadata tag. In such a manner, a list of metadata tags for which the user has implicitly expressed interest or disinterest is gathered. In some embodiments, only digital content the user has interacted with in the recent past is used to determine the list of metadata tags in which the user is implicitly interested or disinterested. In other embodiments, implicit evidence and explicit evidence may be based on any type of user data. Such user data can include any information relevant to a user or relevant to identifying the user preferences 150, for example, and without limitation, age, gender, socio economic information, geographic information, etc. Further, the user data may be based on any number of explicit settings and any type of historical viewing statistics.

In operation, the video asset engine 160 selects targeted scenes within video assets based on the user preferences 150 and additional user interactions. In general, the video asset engine 160 implements a matching algorithm designed to find similarities between the user preferences 150 and per-scene classification metadata 170. For each scene, the per-scene classification metadata 170 may include a variety of data, such as a "Comedy" metadata type or an age classification, that identify characteristics of users that are expected to enjoy the scene. Further, the per-scene classification metadata 170 may include any type of data, at any granularity, that may indicate the general and/or user-specific appeal of a video asset and/or a specific scene included in a video asset. For example, the per-scene classification metadata 170 may include information regarding the actors featured in the video asset, the actresses featured in the video asset, release data, quality rating, motion picture rating, available display resolutions, activity level, popularity, tone, location, plot, length, and so forth. The video asset engine 160 may implement any technically feasible algorithm to match the user preferences 160 and the per-scene classification metadata 170.

Figure 2:
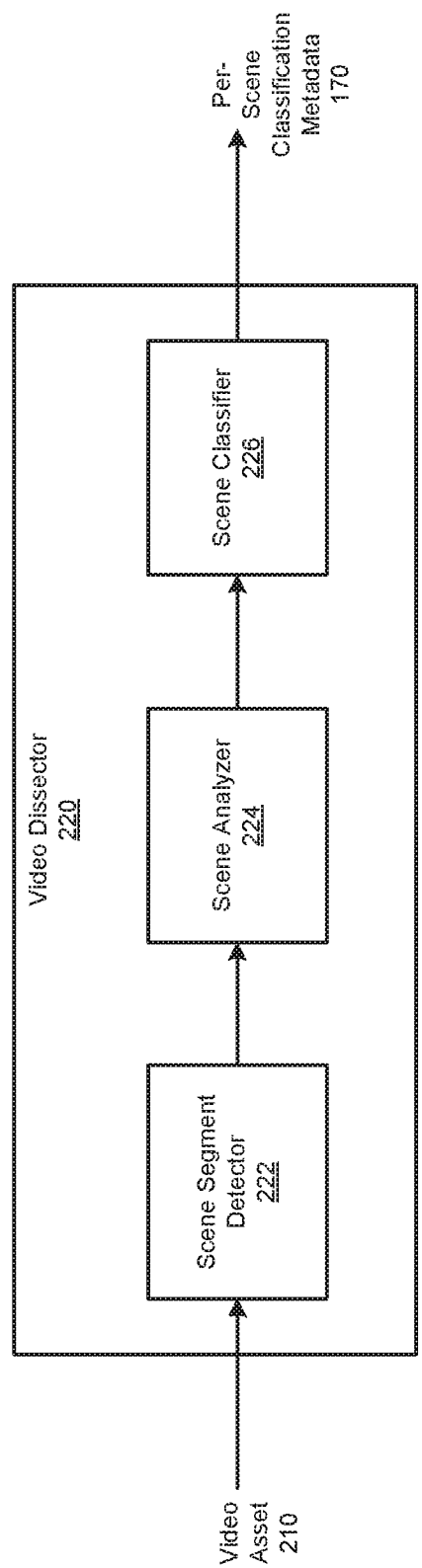
FIG. 2 is a conceptual diagram illustrating a video dissector configured to generate the per-scene classification metadata, according to various embodiments of the present invention.

FIG. 2 is a conceptual diagram illustrating a video dissector 220 configured to generate the per-scene classification metadata 170, according to various embodiments of the present invention. The video dissector 220 processes a video asset 210 (e.g., a movie), decomposes the video asset 210 into multiple scenes, and then generates the per-scene classification metadata 170.

As shown, the video dissector 220 includes, without limitation, a scene segment detector 222, a scene analyzer 224, and a scene classifier 226. The scene segment detector 222 partitions the video asset 210 into distinct scenes, each scene consisting of multiple contiguous frames. Subsequently, the scene analyzer 224 examines each scene to determine scene-specific characteristics that imply classifications. For example, the scene analyzer 224 may determine that a scene includes multiple guns. Next, the scene classifier 226 uses the characteristics to derive general classifications. For example, the scene classifier 226 may determine that an abundance of guns in a scene implies a relatively high level of violence.

Advantageously, the video asset engine 130 may implement the per-scene classification metadata 170 in conjunction with the user preferences 150 to fine-tune video merchandising at the scene-level granularity, increasing the likelihood of appealing to user interest.

Capturing User Interest

Figure 3:
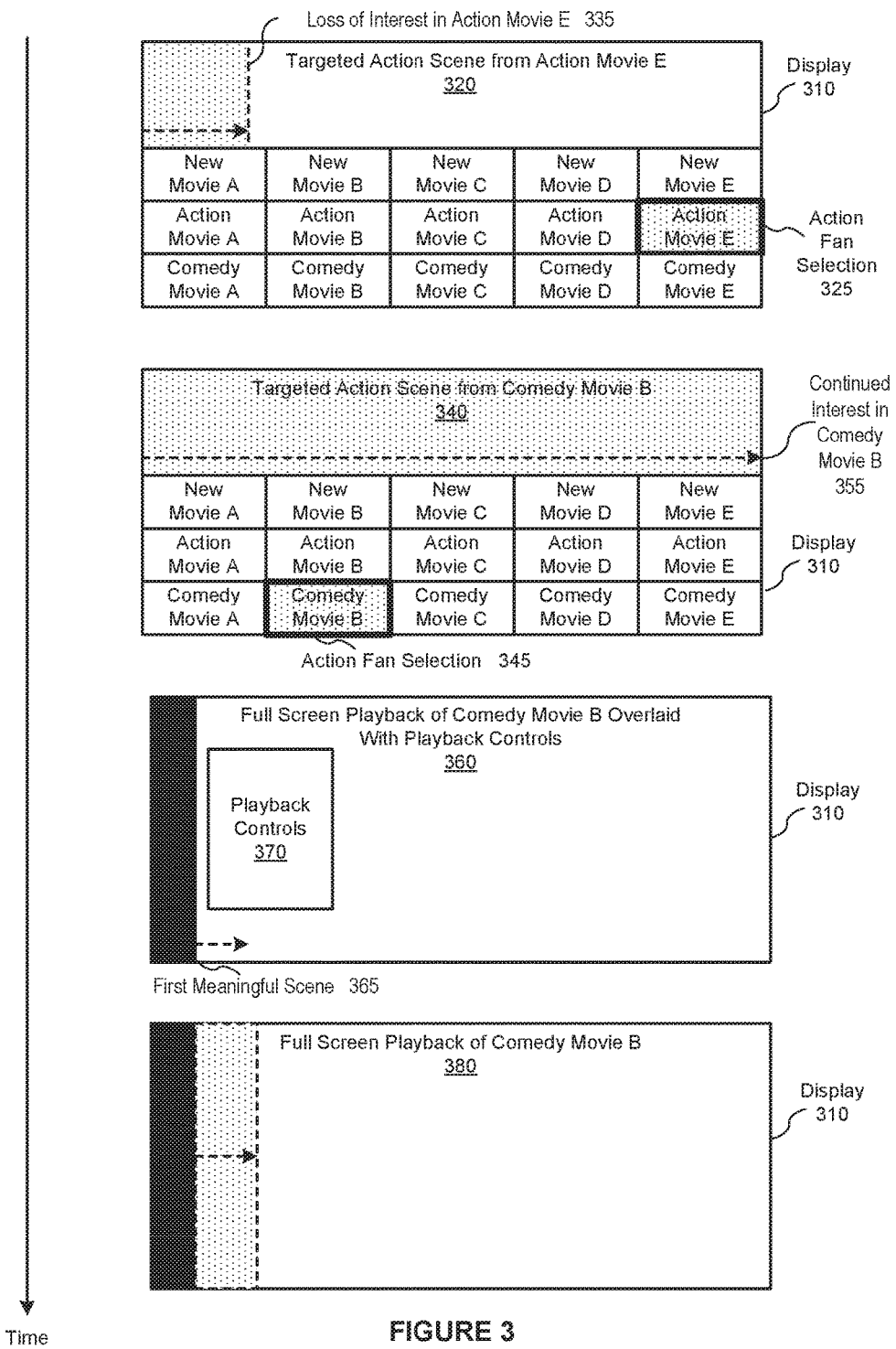
FIG. 3 is a conceptual diagram illustrating how the video asset engine displays, over time, a graphical user interface tailored to an action fan, according to various embodiments of the present invention.

FIG. 3 is a conceptual diagram illustrating how the video asset engine 160 displays, over time, a graphical user interface (GUI) tailored to an action fan, according to various embodiments of the present invention. As shown, a sequence of four snapshots depicts an action fan viewing experience as time passes in a GUI window, labelled as display 310.

In the first time-snapshot, the video asset engine 160 displays a movie selection menu within a lower portion of the display 310 and receives an action fan selection 325 of action movie "E." In response, because the user preferences 150 indicate that the user is an action fan, the video asset engine 160 selects a targeted action scene from action movie E 320 based on the per-scene classification metadata 170 associated with the various scenes from action movie "E." In general, the video asset engine 160 may implement any number of technically feasible heuristics to select a scene that is likely to appeal to a user's interests (e.g., an interest in action movies). For example, if the user preferences 150 indicate that the action fan has a preference for martial arts scenes, then the video asset engine 160 could select an extended martial arts sequence as the targeted action scene from action movie E 320. The video asset engine 160 then displays the targeted action scene from action movie E 320 within an upper portion of the display 310, allowing the action fan to "preview" action movie E while continuing to peruse the movie selection menu displayed in the lower portion of the display 310.

In some embodiments, the video asset engine 160 may detect a loss of interest in a particular scene and select a different scene to display to a user in order to maintain the interest of the user. For example, after a relatively short time compared to the length of the targeted action scene from action movie E 320, the video asset engine 160 detects a loss of interest in action movie E 335. More specifically, as shown in the second time-snapshot, the video asset engine 160 detects an action fan selection 345 of comedy movie "B."

In the second time-snapshot, the video asset engine 160 responds to the action fan selection 345 of comedy movie "B." Notably, because the user preferences 150 indicate that the user is an action fan, the video asset engine 160 selects a targeted action scene from comedy movie B 340 based on the per-scene classification metadata 170 associated with the various scenes from comedy movie B. By contrast, if the user preferences 150 were to indicate that the user was a comedy fan, then the video asset engine 160 would select a comedy scene from comedy movie B. As shown, the video asset engine 160 replaces the playback of the targeted action scene from action movie E 320 with playback of the targeted action scene from comedy movie B 340 within the upper portion of the display 310.

Although the video asset engine 160 continues to display the movie selection menu in the lower portion of the display 310, the action fan does not select another movie during the playback of the targeted action scene from comedy movie B 340. Consequently, the video asset engine 160 determines that the action fan has a continued interest in comedy movie B 355. In response to the continued interest in comedy movie B 355, in the third time-snapshot, the video asset engine 160 commences a full screen playback of comedy movie B overlaid with playback controls 370. In some embodiments, in response to detecting continued interest, the video asset engine 160 commences full screen playback from a first meaningful scene 365 included in comedy movie B. Notably, instead of passively waiting for the action fan to explicitly request playback of comedy movie B, the video asset engine 160 preemptively selects the first meaningful scene 365 and begins playback in the display 310 within the full GUI window.

The video asset engine 160 may select the first meaningful scene 365 in any technically feasible fashion. For example, in some embodiments, the user preferences 150 could indicate that the action fan prefers to skip opening credits and, consequently, the video asset engine 160 would select the first meaningful scene 365 as the scene immediately following the opening credits. In other embodiments, the user preferences 150 could indicate that the action fan has already viewed a portion of comedy movie B 355 and, therefore, the video asset engine 160 would select the first meaningful scene 365 as the first scene that the action fan has not already viewed.

Initially, the video asset engine 160 enables the action fan to override and/or tune the playback of comedy movie B via playback controls 370. The playback controls 370 may include any number of control mechanisms, including selections such as "start from beginning," "pause," "return to movie selection menu," "stop playback," "go to next scene," and so forth.

In the fourth time-snapshot, comedy movie B continues to play without interruption from the action fan via the playback controls 370. To optimize the viewing experience, the video asset engine 160 removes the playback controls 370 and continues a full screen playback of comedy movie B 380 within the display 310. In general, the video asset engine 160 may determine whether to remove the playback controls 370 based on any number of criteria that may indicate continued user interest. For example, in some embodiments, if the video asset engine 160 detects no user interactions for a pre-determined amount of time, then the video asset engine 160 removes the playback controls 370.

In alternate embodiments, the video asset engine 160 may obtain and/or generate the scenes from the video assets 210 in any technically feasible fashion. Further, any number of scenes may be spliced together to create a composite scene that the video asset engine 160 may manipulate in lieu of a single scene. For example, in some embodiments, the video asset engine 160 may be configured to select three separate, discontinuous, scenes from the video asset 210. The video asset engine 160 may select each of the scenes in any technically feasible fashion. For example, the video asset engine 160 may select one scene based on one of the user preferences 150 and select another scene based on another of the user preferences 150 to create a personalized video. In other embodiments, the video asset engine 160 may be configured to select a pre-composed personalized video of multiple scenes based on the user preferences 150.

In yet other embodiments, the video asset engine 160 may display a personalized video in any portion of the display 130 at any point in the viewing experience. Further, the personalized video may include scenes from any number of the video assets 210 in any combination and based on any characteristic(s). For example, if the user preferences 150 indicate that the comedy fan prefers a particular actor, then the video asset engine 160 may create a personalized video that includes scenes from any number of the video assets 210 that feature the actor. The video asset engine 160 may then present the personalized video during the video asset selection process, as depicted in the first time-snapshot and the second time-snapshot of FIG. 3, or as the main viewing experience, as depicted in the third time-snapshot and the fourth time-snapshot of FIG. 3.

Figure 4:
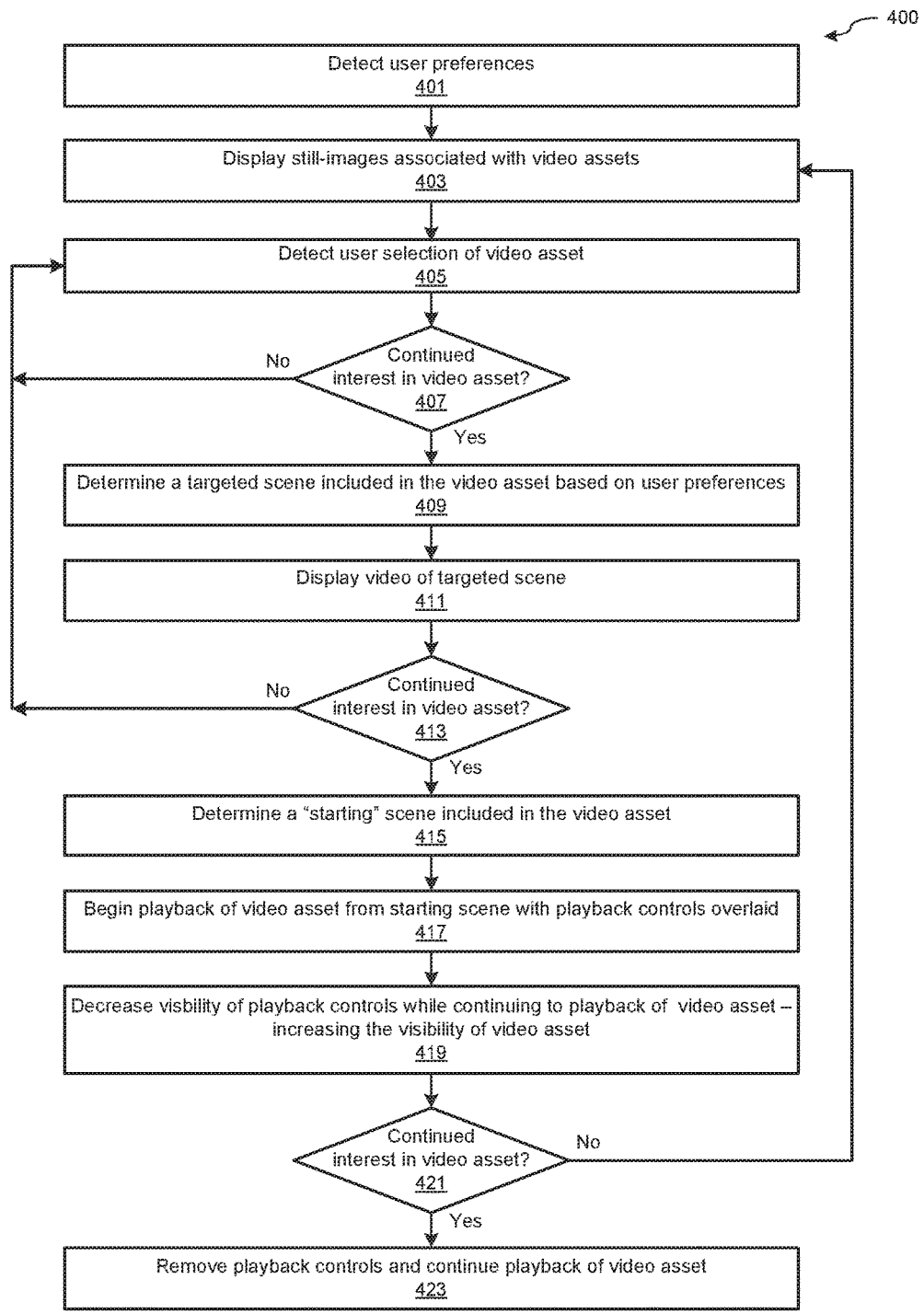
FIG. 4 is a flow diagram of method steps for selecting and playing back user-relevant scenes via a graphical user interface, according to various embodiments of the present invention.

FIG. 4 is a flow diagram of method steps for selecting and playing back user-relevant scenes via a graphical user interface, according to various embodiments of the present invention. Although the method steps are described with reference to the systems of FIGS. 1-3, persons skilled in the art will understand that any system configured to implement the method steps, in any order, falls within the scope of the present invention.

As shown, a method 400 begins at step 401, where the video asset engine 160 detects the user preferences 150. At step 403, the video asset engine 160 displays still-images associated with the video assets 210. At step 405, the video asset engine 160 detects that the user has selected the video asset 210. At step 407, the video asset engine 160 determines whether the user has lost interest in the video asset 210. If, at step 407, the video asset engine 160 determines that the user has lost interest in the video asset 210, then the method 400 returns to step 405 where the video asset engine 160 detects that the user has selected a different video asset 210. The video asset engine 160 may detect that the user has lost interest in the video asset 210 in any technically feasible fashion, such as moving away from the still-image, selecting another still-image, etc. If, however, at step 407, the video asset engine 160 determines that the user has demonstrated continued interest in the video asset 210, then the method 400 proceeds to step 409.

Note that the video asset engine 160 may detect that the user has both selected and has had continued interest in the video asset 210 in any technically feasible fashion, such as detecting that the user is hovering over the still-image or the user has clicked on the still-image. In alternate embodiments, however, the video asset engine 160 may, based on its own logic and operation, determine to proceed to steps 409 and 411. For example, the video asset engine 160 could select the video asset 210 and determine a targeted scene included within the video asset 210 (step 409) without any sort of trigger event and without receiving any specific input from the user. In such embodiments, the video asset engine 160 may, for example, both select the video asset 210 as well as the targeted scene included within the video asset 210 based on the personalized user preferences 150.

At step 409, the video asset engine 160 determines a targeted scene included in the video asset 210 based on the user preferences 150 and the per-scene classification metadata 170. At step 411, the video asset engine 160 displays the video (and provides the audio) of the targeted scene. Next, at step 413, the video asset engine 160 determines whether the user has lost interest in the video asset 210. If, at step 413, the video asset engine 160 determines that the user has lost interest in the video asset 210, then the method 400 returns to step 405 where the video asset engine 160 detects that the user has selected a different video asset 210. In alternate embodiments, the video asset engine 160 may select a different video asset 210 without any sort of trigger event and without receiving any specific input from the user. If, however, at step 413, the video asset engine 160 determines that the user has demonstrated continued interest in the video asset 210, then the method 400 proceeds to step 415.

At step 415, the video asset engine 160 determines a "starting" scene included in the video asset 210. The video asset engine 160 may select the starting scene in any technically feasible fashion based on any type of information, such as default settings and/or the user preferences 150. For example, in some embodiments, the video asset engine 160 may, by default, select the scene immediately following the opening credits as the starting scene. At step 417, the video asset engine 160 begins playback of the video asset 210 from the starting scene within the full GUI window. Although the video asset engine 160 no longer displays still-images associated with the video assets 210, the video asset engine 160 displays the playback controls 370 overlaid within the GUI window. The playback controls 370 enable the user to override and/or tune the automatic playback of the video asset 210.

At step 419, the video asset engine 170 gradually decreases the visibility of the playback controls 270 while continuing to playback the video asset 210, thereby increasing the visibility of the video asset 210. The video asset engine 170 may decrease the visibility of the playback controls 270 in any technically feasible fashion, such as incrementally increasing the transparency of the playback controls 270.

At step 421, the video asset engine 160 determines whether the user has lost interest in the video asset 210. If, at step 421, the video asset engine 160 determines that the user has lost interest in the video asset 210, then the method 400 returns to step 403 where the video asset engine 160 displays still-images associated with the video assets 210. The video asset engine 160 continues to cycle through steps 403-421, tailoring video marketing to reflect user interest expressed via user interactions and the user preferences 150, until the video asset engine 160 determines that the user has demonstrated continued interest in a different video asset 210. If, however, at step 421, the video asset engine 160 determines that the user has demonstrated continued interest in the video asset 210, then the method 400 proceeds to step 423. At step 423, the video asset engine 160 removes the playback controls 370 and continues playback of the video asset 210.

Retaining User Interest

Figure 5:
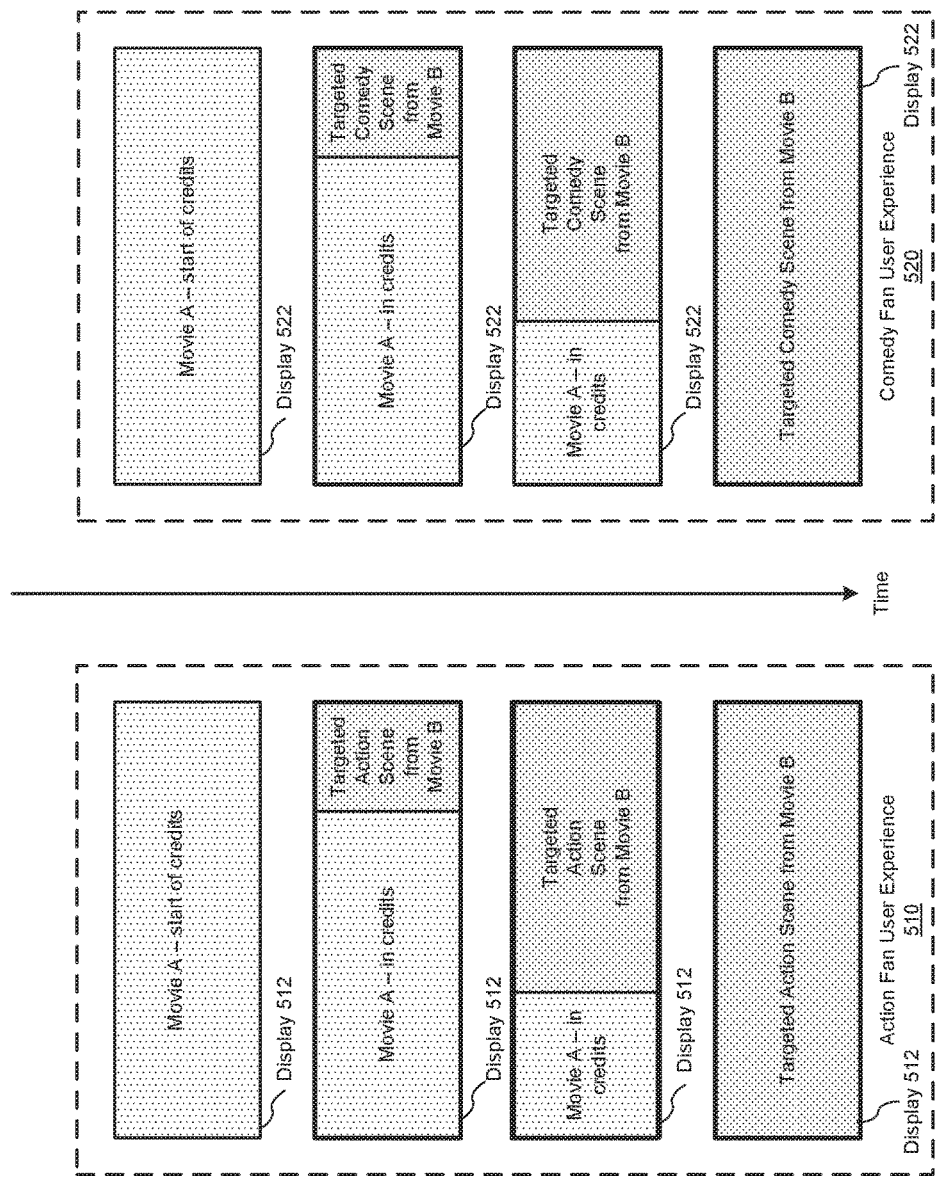
FIG. 5 is a conceptual diagram illustrating how the video asset engine displays, over time, a tailored trailer to a user, according to various embodiments of the present invention.

FIG. 5 is a conceptual diagram illustrating how the video asset engine 160 displays, over time, a tailored trailer to a user, according to various embodiments of the present invention. The left side of FIG. 5 depicts an action fan user experience 510, and the right side of FIG. 5 depicts a comedy fan user experience 520. As shown, each of the action fan user experience 510 and the comedy fan user experience 520 includes a series of four snapshots, depicting each of the viewing experiences as time passes.

Both the action fan and the comedy fan are originally viewing a movie A in a full GUI window—labeled as display 512 and display 522 respectively. In the first time-snapshot, the video asset engine 160 starts displaying the credits for movie A. In the second time-snapshot, the video asset engine 160 selects and displays a targeted scene from movie B in a small portion of the window and continues to display the credits for movie A in the remaining portion of the window. In operation, the video asset engine 160 selects and displays the targeted scene based on correlating the user preferences 150 and user actions with the per-scene classification metadata 170. Notably, the video asset engine 160 displays a targeted action scene from movie B to the action fan but a different scene—a targeted comedy scene—from movie B to the comedy fan.

In the third time-snapshot, the video asset engine 160 displays the targeted scene from movie B in a larger portion of the window and the remaining portion of the window continues to display the credits for movie A. In general, the video asset engine 160 gradually replaces the credits for movie A with the targeted scene as time progresses. In the fourth time-snapshot, the video asset engine 160 has finished displaying the credits for movie A and is displaying the targeted scene from movie B in the full GUI window.

Although not shown in FIG. 5, the video asset engine 160 also may progressively reduce the volume of the credits for movie A and correspondingly increases the volume of the targeted scene from movie B from the first time-snapshot to the fourth time-snapshot. As a general matter, the video asset engine 160 is configured to show different video assets 210, such as movie A and movie B, within a GUI display.

Figure 6:
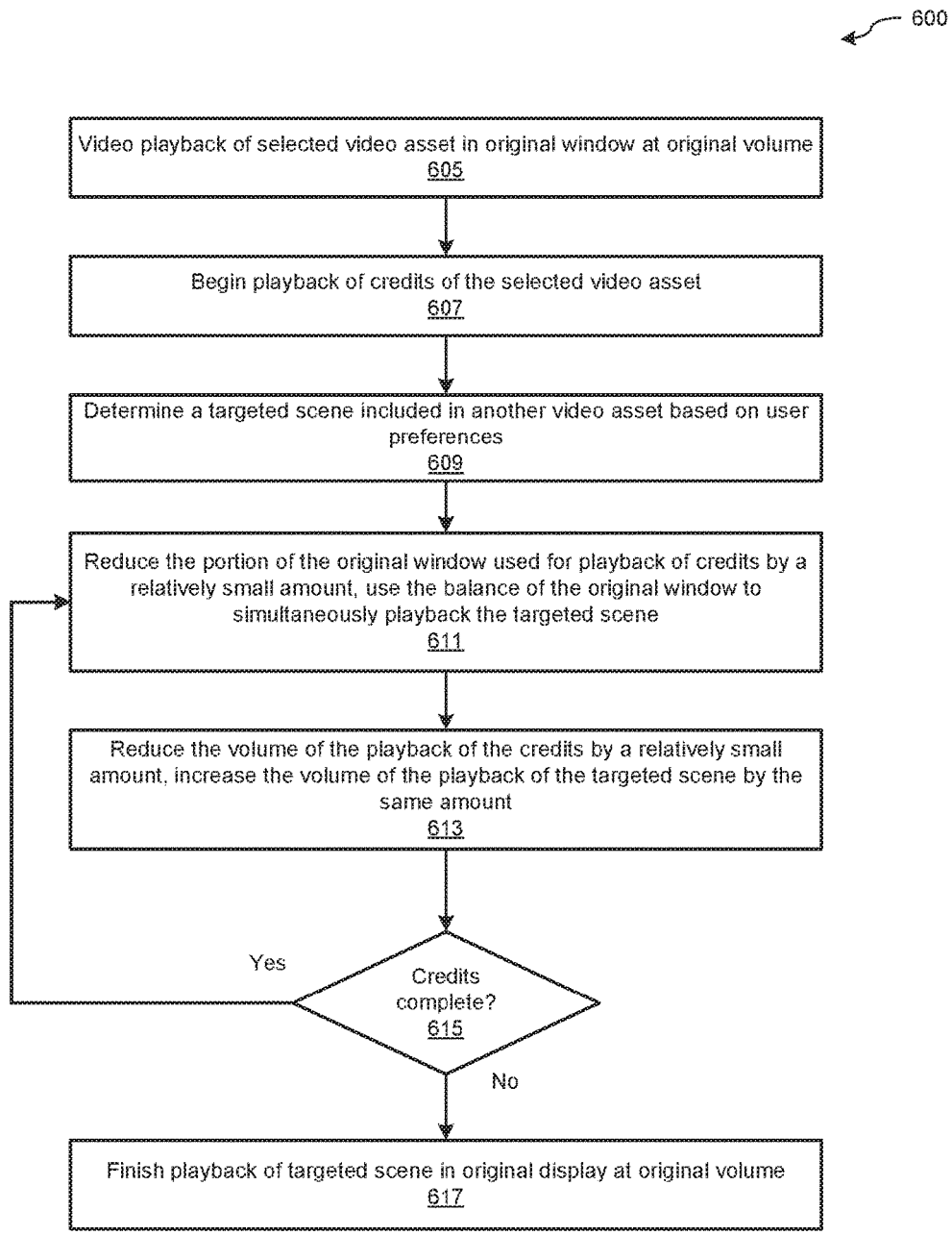
FIG. 6 is a flow diagram of method steps for displaying a tailored trailer to a user, according to various embodiments of the present invention.

FIG. 6 is a flow diagram of method steps for displaying a tailored trailer to a user, according to various embodiments of the present invention. Although the method steps are described with reference to the systems of FIGS. 1-3 and 5, persons skilled in the art will understand that any system configured to implement the method steps, in any order, falls within the scope of the present invention.

As shown, a method 600 begins at step 605, where the video asset engine 160 displays the video asset 210 being viewed in a GUI window at an original volume. The user may select the properties of the GUI window, such as size, and orientation, as well as the magnitude of the original volume in any technically feasible fashion. At step 607, the video asset engine 160 detects that the scene currently being viewed includes closing credits.

At step 609, the video asset engine 160 selects a targeted scene included in a second video based on the user preferences 150 and the per-scene classification metadata 170. For example, if the user preferences 150 indicate that the user enjoys romance films, then the video asset engine 160 could select as the second video asset a romantic movie or a movie that includes romantic scenes. The video asset engine 160 could further select a targeted scene included in that video asset that is characterized as a "romance" scene. Advantageously, the scene selected by the video asset engine 160 is user-specific and is intended to increase the likelihood of retaining or increasing user interest in the second video asset.

At step 611, the video asset engine 160 gradually reduces the portion of the GUI window that the video asset engine 160 uses to display the credits of the video asset 210. Substantially in parallel, the video asset engine 160 begins playback of the targeted scene included in the second video asset 210 in the remaining portion of the GUI window. As part of step 611, the video asset engine 160 may employ a variety of techniques to spatially and/or temporally "smooth" the transition between the two video assets 210, thereby providing a high-quality user experience. At step 613, the video asset engine 160 gradually reduces the volume of the audio stream associated with the credits of the video asset 210, while simultaneously increasing the volume of the audio stream for the targeted scene included in the second video asset 201.

At step 615, if the video asset engine 160 determines that the credits of the video asset 210 have not completed, then the method 600 returns to step 611, where the video asset engine 160 continues to gradually replace the video asset 210 with the targeted scene included in the second video asset 210. If at step 615, the video asset engine 160 determines that the credits of the video asset 210 have completed, then the method 600 proceeds to step 617, where the video asset engine 160 displays the remainder of the targeted scene included in the second video asset 210 within the full GUI window at an increased volume, such as the original volume. In this fashion, the video asset engine 160 gradually transitions from the end of the video asset 210 to a targeted scene included in another video asset 210 in order to maintain user interest by continuously displaying targeted content to the user.

In alternate embodiments, similar to the method 400 described above in FIG. 4, the video asset engine 160 may be configured to select the second video asset 210 based on some sort of trigger event or specific input from the user. Once the second video asset 210 is so identified, the video asset engine 160 determines an appropriate target scene to display to the user based on the user preferences 150 and the per-scene classification metadata 170, as previously described herein. For example, as credits for the selected video asset 210 are playing, the video asset engine 160 may display a series of still-images. Based on user selection of one of the still-images (e.g., via a mouse click or a hovering cursor), the video asset engine 160 selects the targeted scene from within the video asset 210 associated with the still-image based on the user preferences 150 and the per-scene classification metadata 170, as previously described herein.

In general, the video asset engine 160 may leverage any functionality included in the video asset distribution system 100 to further optimize the viewing experience. For example, if a consumer device implements multiple logical decoders, then the video asset engine 160 may leverage the multiple logical decoders to generate a cohesive viewing experience for the user. For example, referring back to FIG. 3, the video asset engine 160 may configure one logical decoder to display the targeted action scene from the action movie E 320 in the upper portion of the display 310 and configure another logical decoder to display the still-images associated with the video assets 210 in the lower portion of the display 310. In another example, referring back to FIG. 5, the video asset engine 160 may implement a dual-decoder technique to "smooth" the spatial and/or temporal transition between the two video assets 210 (movie A and movie B), thereby providing a high-quality user experience.

Leveraging Multiple Decoders to Optimize Viewing Experience

Figure 7A:
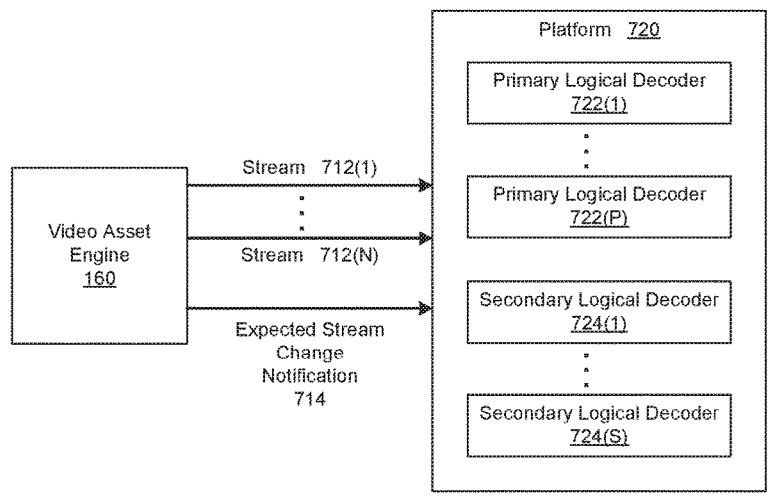
FIG. 7A is a conceptual diagram illustrating how the video asset engine controls multiple logical decoders, according to various embodiments of the present invention.

FIG. 7A is a conceptual diagram illustrating how the video asset engine 160 controls multiple logical decoders, according to various embodiments of the present invention. As shown, the video asset engine 160 issues any number of streams 712 (typically including both video and audio) to a platform 720. The platform 720 is included in the consumer device, such as the laptop 110, and includes at least one primary logical decoder 722 and any number of secondary logical decoders 724.

The platform 720 may be implemented in any technically feasible fashion and may be included in any consumer device. The primary logical decoders 722 are capable of decoding video assets 210 in a manner that is optimal for the platform 720. For example, if the platform 720 implements ultra-high definition (UHD), then the primary logical decoders 722 are each capable of decoding 8.29 million pixels at 60 hertz. By contrast, if the platform 720 implements high definition (HD), then the primary logical decoders 722 are each capable of decoding 2.07 million pixels at 30 hertz. The secondary logical decoders 724 are not capable of decoding video assets 210 in a manner that is optimal for the platform 720 and, therefore, may be unsuitable for full screen and/or extended viewing of the video assets 210. For example, if the platform 720 implements ultra-high definition, then the secondary logical decoders 724 may be limited to decoding 2.07 million pixels at 30 hertz. Additionally, the secondary logical decoders 724 may not support digital rights management (DRM). The primary logical decoders 722 and the secondary logical decoders 724 may be implemented in any technically feasible fashion. For example, in some embodiments, the primary logical decoders 722 and the secondary logical decoders 724 may be implemented as one physical decoder with shared hardware, etc.

In operation, the video asset engine 160 configures the platform 720 to optimally manage the primary logical decoders 722 and the secondary logical decoders 724. The video asset engine 160 may configure the platform 720 in any technically feasible fashion. For example, the video asset engine 160 could determine relative priorities of the streams 712 and set one or more characteristics associated with the streams 712 based on the priorities. Such characteristics would indirectly cause the platform 720 to optimally route the streams 712 to the different primary logical decoders 722 and the secondary logical decoders 724 for display purposes. Examples of such characteristics include display resolution, display area, decoder type (e.g., primary or secondary), etc. In some embodiments, to more effectively transition the video asset 210 from being displayed via the secondary logical decoder 724 to being displayed via the primary logical decoder 722, the video asset engine 160 may transmit a transition image, such as a spinner (e.g., a sequence of still-images that indicates progress such as a wheel or bar), a blank screen, or the like.

As persons skilled in the art will recognize, in some embodiments, the platform 720 manages a "global performance envelope"—a restriction on the maximum throughput of all the primary logical decoders 722 and the secondary logical decoders 724 included in the platform 720. Typically, the global performance envelope is measured in macroblocks per second (MBPS) and allows for the fractional representation of performance. For example, in a dual decoder platform 720, if the primary logical decoder 722 were to have a performance capability of 1080 p at 30 hertz and the secondary logical decoder 724 were to have a performance capability of 480 p at 30 hertz, then the global performance envelope would be 285,300 MBPS.

Typically, as part of managing the global performance envelope, the platform 720 buffers the streams 712 in a holistic manner that reflects the characteristics of the streams 712. To enable the platform 720 to optimally manage the global performance envelope for the streams 712 as part of decoder switching operations, the video asset engine 160 may be configured to issue an expected stream change notification 714 to the platform 720. The stream change notification 714 enables the platform 720 to modify operations, such as buffering, in preparation for upcoming changes in the streams 712.

For example, referring back to FIG. 5, as time passes, the video asset engine 160 could decrease the priority of the stream 712(1) associated with Movie A and increase the priority of the stream 712(2) associated with movie B. Based on these priorities, the video asset engine 160 could set the resolution and display area associated with each of the streams 712 such that the platform 720 re-routes the stream 712(2) from the secondary logical decoder 724 to the primary logical decoder 722. To ensure that the platform 720 optimally buffers the streams 712 as part of the re-routing, the video asset engine 160 could issue the expected stream change notification 714 before changing the display resolutions and display areas associated with the streams 712. More specifically, the video asset engine 160 could configure the platform 720 to compensate for a network buffer depth 755 (measured in time) that reflects the global performance envelope managed by the platform 720.

Figure 7B:
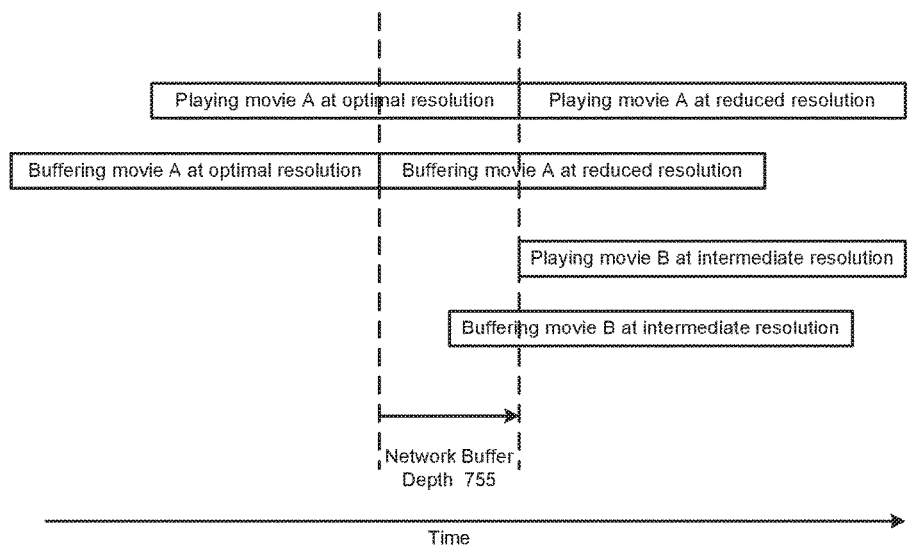
FIG. 7B is a conceptual diagram illustrating how the video asset engine compensates for a network buffer depth according to various embodiments of the present invention.

FIG. 7B is a conceptual diagram illustrating how the video asset engine 160 compensates for the network buffer depth 755 according to various embodiments of the present invention. In operation, the video asset engine 160 sets the characteristics of the streams 712 and issues the expected stream change notification 714 that configures the platform 720 to perform the operations illustrated in FIG. 7B.

Initially, the video asset engine 160 sets the display resolution of the stream 712(1) associated with the movie A to an optimal resolution, causing the platform 720 to buffer the stream 712(1) at the optimal resolution and then begins to playback the movie A at the optimal resolution.

After some time passes, the video asset engine 160 issues the expected stream change notification 714, reduces the display resolution of the stream 712(1), and sets the display resolution of the stream 712(2) associated with the movie B to an intermediate resolution. The intermediate resolution lies between the optimal resolution and the reduced resolution at a value commiserate with the global performance envelope.

In response to the expected stream change notification 712, the platform 720 begins buffering movie A at the reduced resolution instead of the optimal resolution. The platform 720 then begins buffering the movie B at the intermediate resolution. After the network buffer depth 755 has passed, the platform 720 begins playback of movie A at the reduced resolution and playback of movie B at the intermediate resolution.

Figure 8:
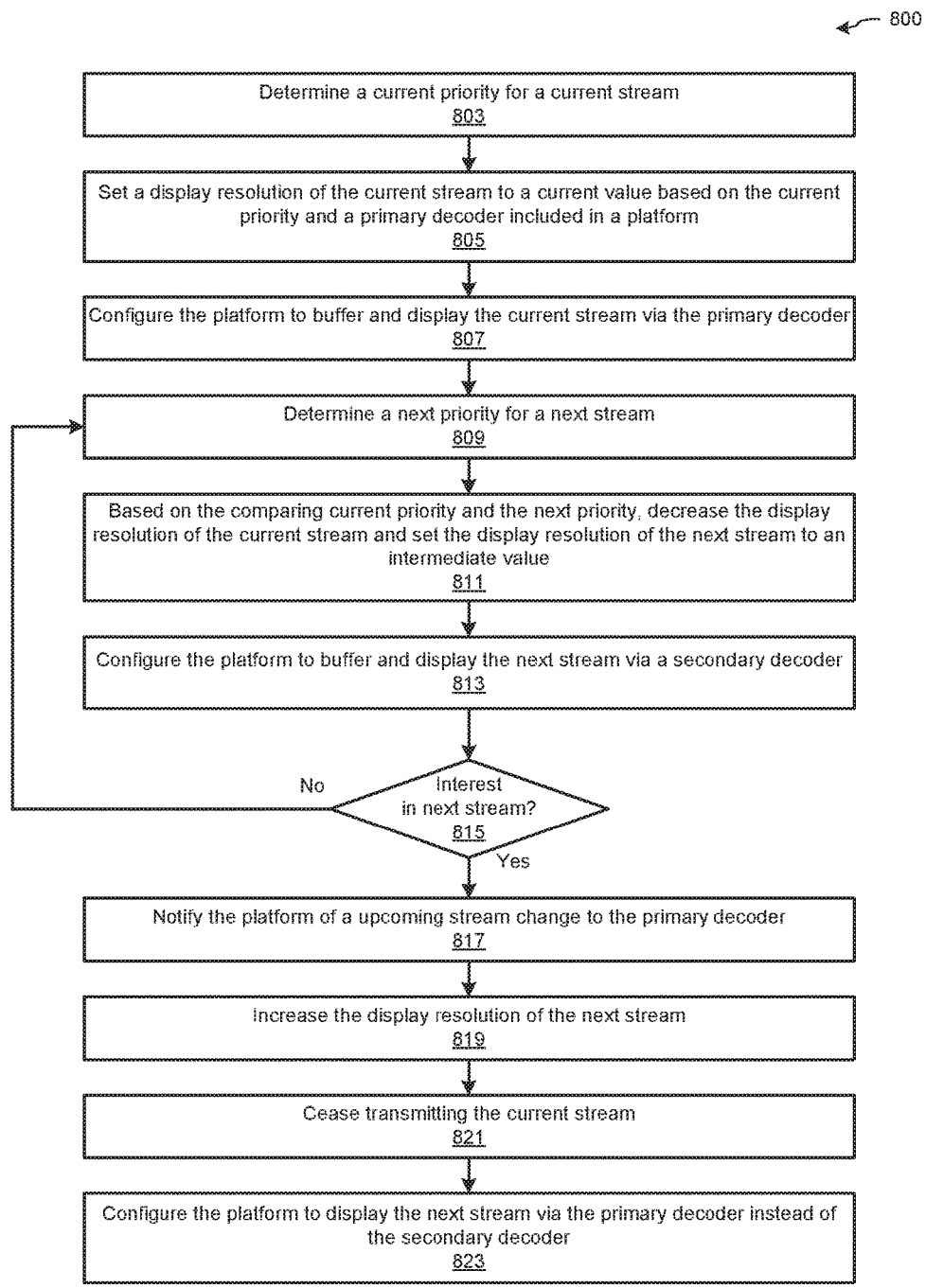
FIG. 8 is a flow diagram of method steps for displaying video assets via multiple decoders, according to various embodiments of the present invention.

FIG. 8 is a flow diagram of method steps for displaying video assets via multiple decoders, according to various embodiments of the present invention. Although the method steps are described with reference to the systems of FIGS. 1-3, 5, and 7, persons skilled in the art will understand that any system configured to implement the method steps, in any order, falls within the scope of the present invention.

As shown, a method 800 begins at step 803, where the video asset engine 160 determines a current priority for a current stream 712 that is associated with a current video asset 210. At step 805, the video asset engine 160 sets a display resolution associated with the current stream 712 based on the current priority and commiserate with the capabilities of the primary decoder 722 included in the platform 720. The video asset engine 160 may determine the current priority and the display resolution in any technically feasible fashion based on any relevant information. For example, the video asset engine 160 may select the display resolution from a set of available display resolutions associated with the video asset 210 and based on the global performance envelope managed by the platform 720.

At step 807, the video asset engine 160 configures the platform 720 to buffer and display the current stream 712 via the primary decoder 722. The video asset engine 160 may configure the platform 720 in any technically feasible fashion using direct and/or indirect techniques in any combination. For example, in some embodiments, the video asset engine 160 may set the values of one or more characteristics associated with the current stream 712. In other embodiments, the video asset engine 160 may determine that one or more characteristics associated with the current stream 712 indirectly cause the platform 720 to buffer and display the current stream 712 in the desired manner. The video asset engine 160 then transmits the current stream 712 to the platform 720 for display purposes.

At step 809, the video asset engine 160 determines a next priority for a next stream 712. At step 811, the video asset engine 160 performs a comparison between the current priority and the next priority. Based on the results of the comparison, the video asset engine 160 reduces the display resolution of the current stream 712 and sets the display resolution associated with the next stream 712 to an intermediate value. The video asset engine 160 may determine the next priority and the display resolutions in any technically feasible fashion. For example, if the current stream 712 was associated with a feature film and the next stream 712 was associated with a teaser video, then the video asset engine 160 could set the next priority to a relatively low value compared to the current priority. Further, based on these relative priorities, the video asset engine 160 could reduce the display resolution associated with the current stream and set the display resolution associated with the next stream to a value lower than the reduced display resolution. In some embodiments, the video asset engine 160 may set the display resolution associated with the current stream and the display resolution associated with the next stream based on the global performance envelope managed by the platform 720.

At step 813, the video asset engine 160 configures the platform 720 to buffer and display the next stream 712 via the secondary decoder 724. The video asset engine 160 may configure the platform 720 in any technically feasible fashion using either direct or indirect techniques Notably, after configuring the platform 720 to buffer and display the next stream 712, the video asset engine 160 transmits both the current stream 712 and the next stream 712 to the platform 720 for display purposes.

At step 815, the video asset engine 160 determines whether the user has demonstrated interest in the next stream 712. If, at step 815, the video asset engine 160 determines that the user has relatively little interest in the next stream 712, then the method 800 returns to step 809 where the video asset engine 160 selects a different next stream 712. If, however, at step 815, the video asset engine 160 determines that the user has demonstrated continued interest in the next stream 712, then the method 800 proceeds to step 817. Note that the video asset engine 160 may detect that the user has continued interest in the next stream 712 in any technically feasible fashion.

At step 817, the video asset engine 160 transmits the expected stream change notification 714 to the platform 720. More specifically, the video asset engine 160 notifies the platform 720 to prepare for a switch from displaying the next stream 712 via the secondary decoder 724 to displaying the next stream 712 via the primary decoder 722. The video asset engine 160 orchestrates such a switch to optimize the viewing experience for the user as per the demonstrated interest of the user.

At step 819, the video asset engine 160 increases the display resolution associated with the next stream 712. In response, the platform 720 begins to buffer the next stream 712 at the increased resolution. At step 821, the video asset engine 160 ceases to transmit the current stream 712. At step 823, the video asset engine 160 configures the platform 720 to display the next stream 712 via the primary decoder 722 instead of the secondary decoder 724. In this manner, based on detected user interest, the video asset engine 160 leverages the primary decoder 722 and the secondary decoder 724 included in the platform 720 to optimize the viewing experience.

In sum, among other things, embodiments of the present invention are directed towards enhancing user interest in video merchandising. In some embodiments of the present invention, a video asset engine leverages a video dissection capability that decomposes a video into scenes and generates scene-specific classification metadata to select user-relevant scenes from within video assets. In addition, in some embodiments of the present invention, the video asset engine dynamically adjusts playback between two video streams to strategically transition user interest. In particular, as one video asset is ending, the video asset engine selects a scene included in another video asset to reflect user preferences and incrementally replace the ending video asset with the selected scene.

In various embodiments, the video asset engine configures any number of decoders to simultaneously display multiple scenes, where each scene is included in one of the video assets. In yet other embodiments, the video asset engine configures multiple decoders to work together to provide smooth transitions as the video asset engine displays different video assets.

Advantageously, by tailoring scene selection and integrating playback of selected scenes into an overall viewing experience, the video asset engine increases the probability of acquiring and maintaining user interest in video assets. More specifically, by selecting personalized scenes and presenting the selected scenes in a contextually-relevant manner, the video asset engine is able to more effectively convince the user that he or she would enjoy viewing the selected video asset. Further, by predicting a loss of interest in a current video asset (e.g., playback of ending credits) and seamlessly redirecting viewer interest to additional video assets via multiple decoders, the video asset engine generates an immersive and targeted viewing experience.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method, comprising:
   displaying a plurality of still images associated with a plurality of video assets within a display, wherein the plurality of still images are amenable to interaction;
   detecting that a user has selected a first video asset included in the plurality of video assets based on at least one interaction with a first still-image included in the plurality of still-images and corresponding to the first video asset;
   determining that the user has continued interest in the first video asset;
   in response to the user having continued interest:
      determining a target scene included in the first video asset for the user;
      displaying a video of the target scene within the display; and
      continuing to display the plurality of still images within the display concurrently with displaying the video of the targeted scene, wherein the plurality of still images remains amenable to interaction;
   determining that the user has continued interest in the first video asset after displaying the video of the target scene; and
   in response to the user having continued interest after displaying the video of the target scene and prior to a request from the user to play back the first video asset:
      determining a starting scene included in the first video asset; and
      playing back the first video asset from the starting scene within the display.

2. The method of claim 1, further comprising detecting one or more preferences of the user.

3. The method of claim 2, wherein determining the target scene comprises comparing the one or more user preferences of the user against metadata associated with the first video asset.

4. The method of claim 1, wherein playing back the first video asset from the starting scene comprises playing back the first video asset within a graphical user interface window displayed within the display, and further comprising overlaying playback controls within the graphical user interface window.

5. The method of claim 4, further comprising decreasing visibility of the playback controls within the graphical user interface window, while continuing to playback the first video asset, to increase visibility of the first video asset within graphical user interface window.

6. The method of claim 5, wherein decreasing the visibility of the playback controls comprises incrementally increasing the transparency of the playback controls.

7. The method of claim 1, further comprising determining that user has continued interest in the first video asset after playing back at least a portion of the starting scene.

8. The method of claim 7, further comprising, in response to the user still having continued interest after playing back a portion of the starting scene, no longer displaying the playback controls within the graphical user interface window, and continuing playback of the first video asset.

9. The method of claim 1, wherein the starting scene comprises a scene included in the first video asset that immediately follows the opening credits.

10. The method of claim 1, wherein determining that the user has continued interest in the first video asset comprises determining that a cursor is hovering over the first still-image or that a cursor has clicked on the first still-image.

11. A non-transitory computer-readable storage medium including instructions that, when executed by a processor, cause the processor to perform the steps of:
   detecting that a user has selected a first video asset included in a plurality of video assets based on at least one interaction with a first still-image included in a plurality of still-images and corresponding to the first video asset, wherein the plurality of still images are amenable to interaction;
   determining that the user has continued interest in the first video asset;
   in response to the user having continued interest:
      determining a target scene included in the first video asset for the user;
      displaying a video of the target scene within the display; and continuing to display the plurality of still images within the display concurrently with displaying the video of the targeted scene, wherein the plurality of still images remains amenable to interaction;

determining that the user has continued interest in the first video asset after displaying the video of the target scene; and in response to the user having continued interest after displaying the video of the target scene and prior to a request from the user to play back the first video asset:
determining a starting scene included in the first video asset; and
playing back the first video asset from the starting scene within the display.

12. The non-transitory computer-readable storage medium of claim 11, wherein determining the target scene comprises comparing one or more user preferences of the user against metadata associated with the first video asset.

13. The non-transitory computer-readable storage medium of claim 11, further comprising displaying playback controls within the display.

14. The non-transitory computer-readable storage medium of claim 13, further comprising decreasing visibility of the playback controls within the display by incrementally increasing the transparency of the playback controls.

15. The non-transitory computer-readable storage medium of claim 14, wherein decreasing the visibility of the playback controls increases visibility of the first video asset within the display.

16. The non-transitory computer-readable storage medium of claim 11, further comprising determining that user has continued interest in the first video asset after playing back at least a portion of the starting scene.

17. The non-transitory computer-readable storage medium of claim 16, further comprising, in response to the user still having continued interest after playing back a portion of the starting scene, continuing playback of the first video asset within the display without displaying the playback controls within the display.

18. The non-transitory computer-readable storage medium of claim 17, wherein determining that the user has continued interest in the first video asset after playing back at least a portion of the starting scene comprises detecting no user interactions for a predetermined amount of time.

19. The non-transitory computer-readable storage medium of claim 11, wherein the starting scene comprises a scene included in the first video asset that immediately follows the opening credits.

20. A system, comprising:
a memory including a video asset engine; and
a processor that is coupled to the memory and, when executing the video asset engine, is configured to:
detect that a user has selected a first video asset included in a plurality of video assets based on at least one interaction with a first still-image included in a plurality of still-images and corresponding to the first video asset, wherein the plurality of still images are amenable to interaction;
determine that the user has continued interest in the first video asset;
in response to the user having continued interest:
determine a target scene included in the first video asset for the user;
display a video of the target scene within the display; and
continue to display the plurality of still images within the display concurrently with displaying the video of the targeted scene, wherein the plurality of still images remains amenable to interaction;
determine that the user has continued interest in the first video asset after displaying the video of the target scene; and
in response to the user having continued interest after displaying the video of the target scene and prior to a request from the user to play back the first video asset:
determine a starting scene included in the first video asset; and
playback the first video asset from the starting scene within the display.

\* \* \* \* \*